(12) United States Patent
Traylor et al.

(10) Patent No.: US 6,672,250 B1
(45) Date of Patent: Jan. 6, 2004

(54) MOLDED MAGNETIC COMPONENTS FOR USE IN AQUATIC ENVIRONMENTS

(76) Inventors: Thomas A. Traylor, 6437 E. Avalon #B, Mesa, AZ (US) 85205; Roger H. Traylor, 7254 E. Catalina Ave., Mesa, AZ (US) 85208

( * ) Notice: Subject to any disclaimer, the term of this patent is extended or adjusted under 35 U.S.C. 154(b) by 0 days.

(21) Appl. No.: 10/234,909

(22) Filed: Sep. 4, 2002

(51) Int. Cl.[7] .............................................. A01K 63/00
(52) U.S. Cl. ...................... 119/256; 119/245; 119/247; 119/246; 119/253; 119/269; 119/221; 248/309.4
(58) Field of Search ................................ 119/256, 245, 119/247, 253, 269, 221, 246; 446/129–139; D21/404; 248/309.4

(56) References Cited

U.S. PATENT DOCUMENTS

| | | | |
|---|---|---|---|
| 4,708,089 A | * 11/1987 | Goldman et al. | 119/248 |
| 4,787,336 A | * 11/1988 | Lineberry | 119/246 |
| 5,463,826 A | * 11/1995 | Horiuchi | 40/426 |
| 5,778,824 A | * 7/1998 | Musgrave et al. | 119/230 |
| 5,857,430 A | * 1/1999 | Griffiths | 119/256 |
| 6,148,770 A | * 11/2000 | Lin | 119/253 |
| 6,206,978 B1 | * 3/2001 | Tsui | 134/8 |
| 6,484,428 B1 | * 11/2002 | Greenwald et al. | 40/600 |
| 2001/0044253 A1 | * 11/2001 | Saito et al. | 446/136 |

FOREIGN PATENT DOCUMENTS

| | | | | |
|---|---|---|---|---|
| EP | 0627248 A2 | * | 6/1994 | A63H/33/26 |
| JP | 406105962 A | * | 4/1994 | A63H/23/14 |

* cited by examiner

*Primary Examiner*—Peter M. Poon
*Assistant Examiner*—Andrea M. Valenti

(57) ABSTRACT

New and improved molded magnetic geometrical components are used as underwater ornamentation to form the scenery in aquariums and other aquatic displays. These modular imitation rocks and/or other shapes, when added to an aquarium will create a natural setting for the fish. These rocks, gravel, reefs, and other water icons are constructed, in various shapes, sizes, and colors, out of magnetizable materials, having north and south magnetic poles. To form the display, a two-dimensional background structure of the display is constructed from a ferromagnetic material. A first layer of the shaped molded magnetic components are then placed on the background structure, with the magnetic component's north and south poles properly aligning to firmly hold the components on the background structure. Then the various molded magnetic components are stacked on to the first layer of molded magnetic components to construct a three-dimensional scene. The invention offers a practical, creative advantage to standard tank display accessories, which will allow the fish to appear in their natural habitat.

12 Claims, 3 Drawing Sheets

MOLDED MAGNETIC COMPONENTS FOR USE IN AQUATIC ENVIRONMENTS

BACKGROUND OF THE INVENTION

1. Field of the Invention

The present invention relates to magnetic decorative components for use in connection with aquatic scene ornamentation. These molded magnetic geometrical components have particular utility in connection with aquariums, waterfalls, water fountains, caves, and other underwater displays.

2. Description of the Prior Art

Beautiful underwater scene ornamentation, such as in aquariums, water fountains, caves and tunnels at amusement parks, etc. are enjoyed by many people. However, for the most part these are fixed scenes made up of rocks, gravel, concrete structures, plants, etc. that can't be easily changed or rearranged and can be very difficult to clean.

Magnetic properties have been used in sculpting toys for building structures using magnetic building blocks. The present invention is about applying magnetic properties to aquatic ornamentation applications.

Both magnetic toys for building blocks and aquarium ornamentation are known in the prior art. For example, U.S. Pat. No. 5,152,711 to Gross discloses a magnetic toy having sculptural particles. However, the Gross '711 patent does not address materials used in underwater applications, and has the further drawback of addressing only building structures and not scenery or landscaping.

U.S. Pat. No. 3,077,696 to Barnett et al. discloses a magnetic kit that relates to magnetic apparatus suitable for use in educational kits and games. However, the Barnett '696 patent does not address materials used in underwater applications, nor does it disclose magnetic materials for use in scenery or landscaping.

Similarly, U.S. Des. Pat. No. D278,465 to Goldman et al. discloses an aquarium structural ornament that has the appearance of a bridge. However, the Goldman '465 patent does not disclose functional magnetic properties, and further does not address materials used in underwater applications.

Lastly, U.S. Pat. No. 1,535,035 to Philipp, U.S. Pat. No. 6,196,848 to Yamazaki, and U.S. Pat. No. 5,067,059 to Hwang may be of general interest and pertinent to the construction of the present invention. However, the Philipp '035 patent does not disclose the use of magnetic materials in underwater applications and the Yamazaki '848 patent does not disclose the utility of the present patent. Finally, the Hwang '059 patent addresses only the ornamental aspects of an aquatic scene, but does not disclose any magnetic properties.

While the above-described devices fulfill their respective, particular objectives and requirements, the aforementioned patents do not describe magnetic aquatic materials that allows for the initial decoration or rearrangement of an underwater scene.

Therefore, a need exists for new and improved magnetic aquatic decorative components that can be used for decorating and rearranging aquariums, waterfalls, water fountains, caves, and other underwater displays. In this regard, the present invention substantially fulfills this need. In this respect, the magnetic aquatic decorative components according to the present invention substantially depart from the conventional concepts and designs of the prior art, and in doing so provide magnetic components primarily developed for use in underwater environments.

SUMMARY OF THE INVENTION

In view of the foregoing disadvantages inherent in the known types of aquatic displays (aquariums) now present in the prior art, the present invention provides an improved display and method, and overcomes the above-mentioned disadvantages and drawbacks of the prior art. As such, the general purpose of the present invention, which will be described subsequently in greater detail, is to provide a new and improved aquatic display and method which has all the advantages of the prior art mentioned heretofore and many novel features that result in an aquatic display that is not anticipated, rendered obvious, suggested, or even implied by the prior art, either alone or in any combination thereof.

To attain this, the present invention essentially comprises an aquarium (aquatic display) that utilizes new and improved molded magnetic geometrical components as underwater ornamentation to form the scenery in, under, and around the water content of the display. These modular imitation rocks and/or other shapes, when added to an aquarium will create a natural setting for the fish. To accomplish this rocks, gravel, reefs, and other water icons are constructed, in various shapes, sizes, and colors, out of magnetizable materials. These decorative items are then magnetized to have north and south magnetic poles. To form the display in an aquarium or other water display, a two-dimensional background structure of the display is constructed from a ferromagnetic material, which will attract a magnet. This background form can be constructed in horizontal, vertical, and diagonal planes, as desired. A first layer of the molded magnetic components are then placed on the background structure, with the magnets poles properly aligning to firmly hold the magnets on the background structure. Then molded magnetic components of various shapes, sizes, and colors are stacked on to the first layer of molded magnetic components to construct a three-dimensional scene. In addition, greenery such as grass, weeds, etc., which have permanent magnets attached at the base, can be added to the scene to provide a realistic appearance. These base magnets prevent the greenery from floating or otherwise moving around in the display water.

In practice, the magnets could be offered in a kit, which would allow one to assembly them according to his/her desires to resemble natural rock-like formations, which once in place will provide a decorative, visually appealing display within the aquarium. The kit will have numerous pieces of various shapes, sizes, and colors that will allow an aquarium owner to tailor the design to his/her specific wishes. Moreover, the modular design will allow the user to periodically modify or completely rearrange the decorative design.

The appealing features of the present invention are its entertainment value, attractiveness, novelty, safety, and relative inexpensiveness. The invention offers a practical, creative advantage to standard tank display accessories, and its design will permit the fish to appear in the natural habitat, which may give an aquarium a new look. Once the desired scene is established, it is held in place by magnetic forces and will not be disturbed by the activity of the fish moving the items around in the water. It is even speculated by some that the fish will get an aerobic benefit from trying to push the rocks and other items being held by magnetic forces. Also, the magnetic components of the present invention can also be used in regular landscape situations in the absence of water.

The methods of the present invention can benefit users from the individual aquarium buff to large commercial users like amusement parks in the construction of various water tanks, water falls, caves, tunnels, etc. One additional advantage is that the magnet rock, gravel, and other components can be used over and over, thereby reducing the capital and maintenance cost of such items.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention is to provide new molded magnetic geometrical components that provides in the apparatuses and methods of the prior art some of the advantages thereof, while simultaneously overcoming some of the disadvantages normally associated therewith.

It is another object of the present invention to provide new and improved molded magnetic geometrical components that may be easily and efficiently manufactured and marketed.

An even further object of the present invention is to provide new and improved molded magnetic geometrical components that has a low cost of manufacture with regard to both materials and labor, and which accordingly is then susceptible of low prices of sale to the consuming public, thereby making such products economically available to the buying public.

Lastly, it is an object of the present invention to provide a new and improved method for arranging an aquatic display and maintaining it.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
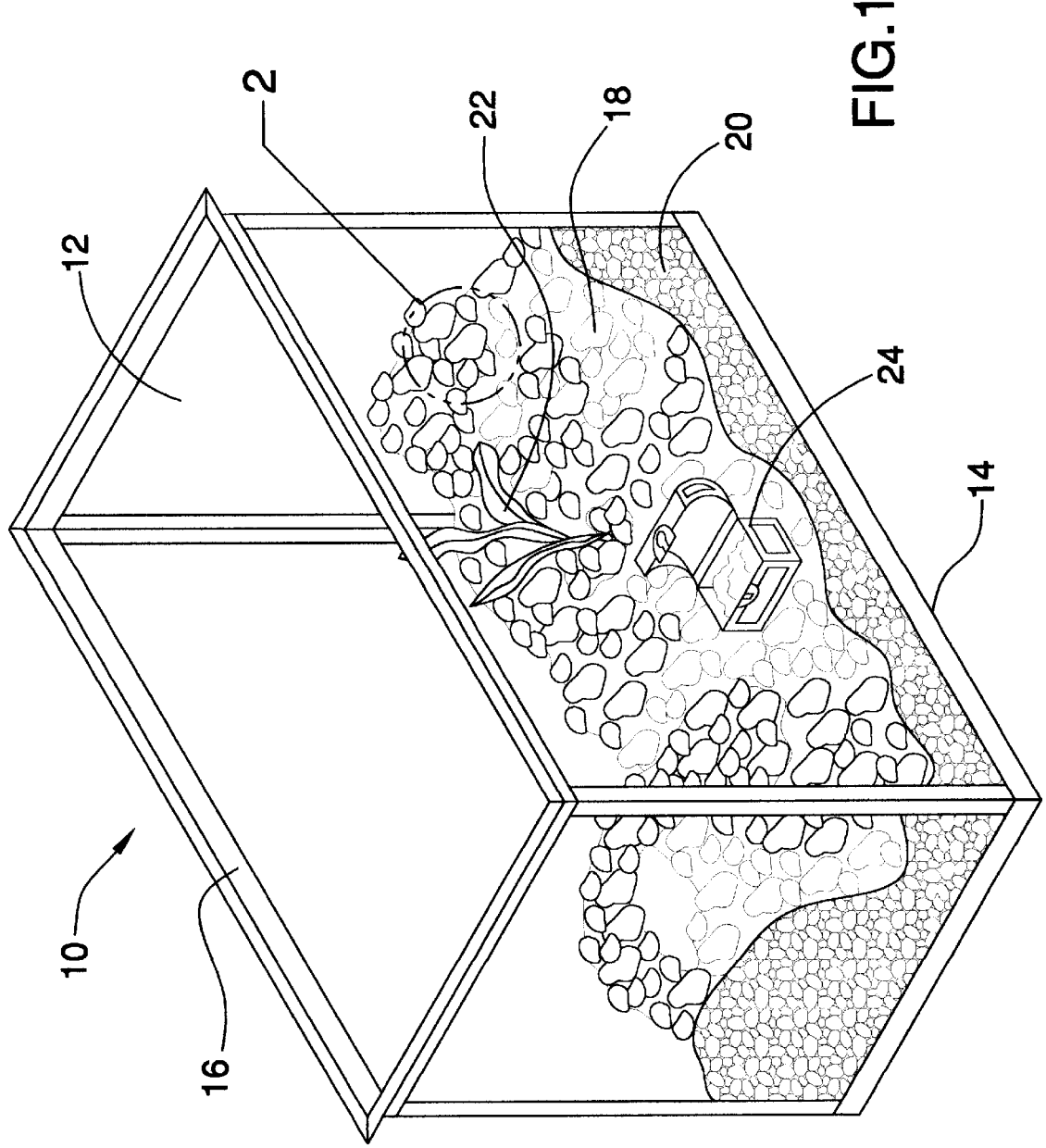
FIG. 1 is a perspective drawing of an aquarium constructed in accordance with the principles of the preferred embodiment of the present invention where molded magnetic components are used as ornamentation.
Figure 2:
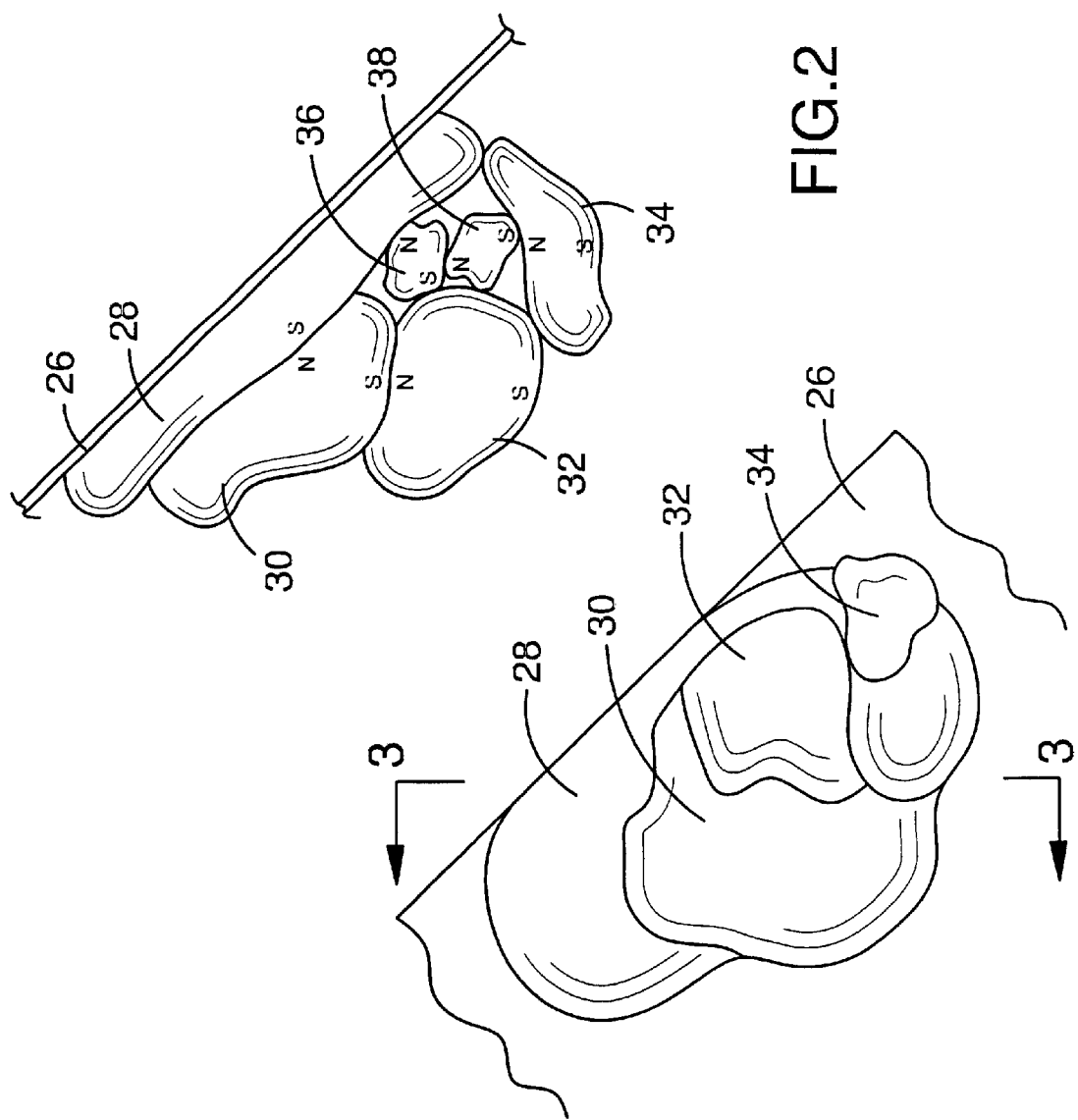
FIG. 2 is a cross sectional drawing of a section in the aquarium of the preferred embodiment of the present invention showing top and side views of the molded magnet components being stacked and magnetically attached to one another.
Figure 3:
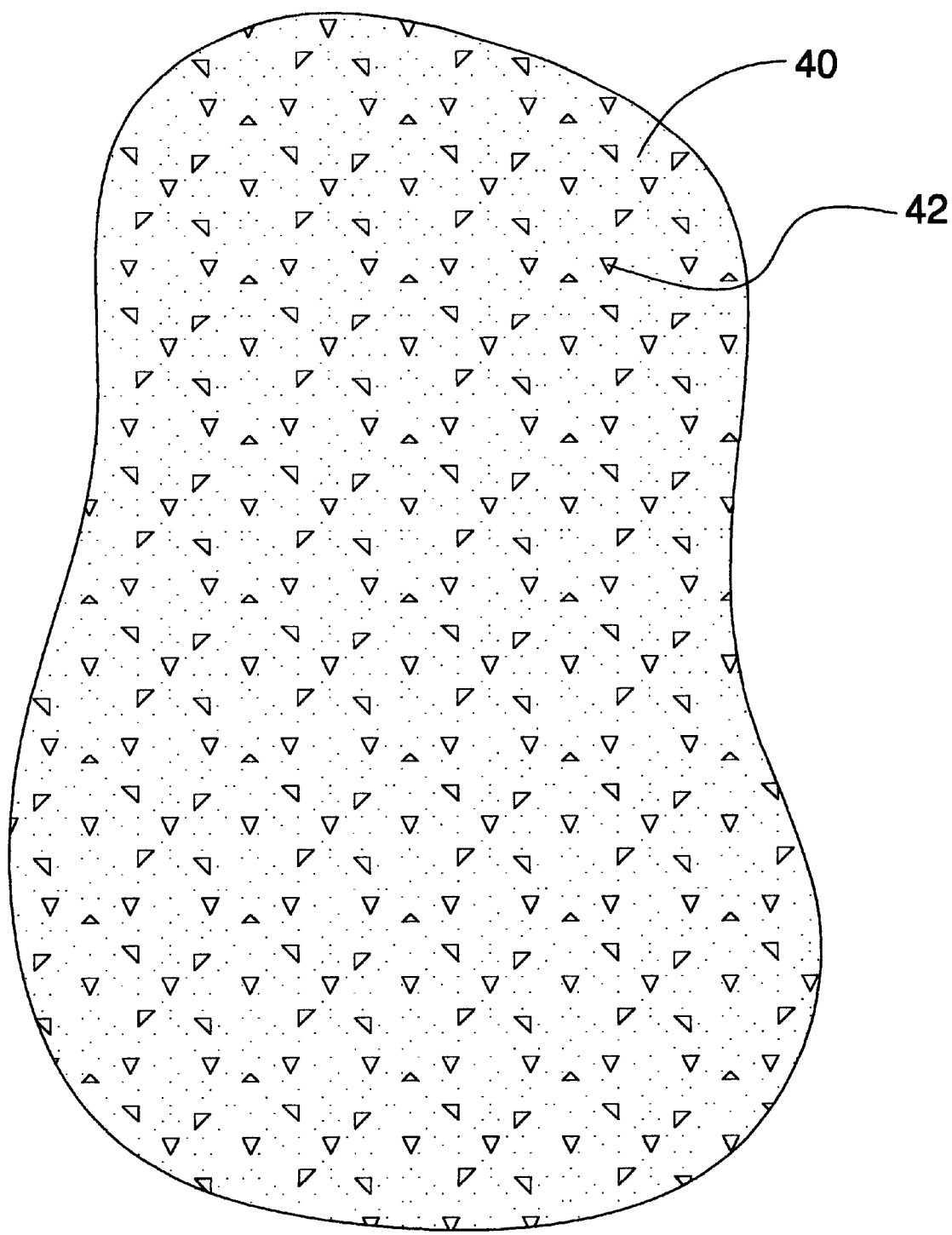
FIG. 3 is a cross sectional view of the magnetic rocks of FIG. 2, showing the magnetic particles and the alignment of their magnetic moments.

Referring now to the drawings, and particularly to FIGS. 1–3, a preferred embodiment of the molded magnetic decorative components of the present invention is shown and generally designated by the reference numeral 10.

In FIG. 1, an aquarium 10 having a decorative environment constructed with the new and improved molded magnetic components of the present invention is illustrated and will be described. More particularly, the aquarium 10 has transparent sides 12 (typically glass) with a solid bottom 14 and open top 16. The three-dimensional aquatic scenery inside the aquarium 10 is shown on the bottom and extending up the sides of the aquarium.

To attain this, molded magnetic geometrical components are used as underwater ornamentation. These components include modular imitation rocks 18, gravel 20, and other underwater icons 24. Greenery 22, which has permanent magnet bases, can be added to the scene to create a natural setting for the fish. The molded magnetic geometric components include items such as rocks, gravel, reefs, and other water icons and are constructed, in various shapes, sizes, and colors, from magnetizable alloys. These decorative items are then magnetized to have north and south magnetic poles.

To form the display in an aquarium or other water display, a two-dimensional background structure of the display (not shown in this figure) is constructed from a ferromagnetic material, which will attract a magnet. This background form can be constructed in horizontal, vertical, and diagonal planes, as desired. A first layer of the molded magnetic components are then placed on the background substrate structure, with the magnet's poles properly aligning to firmly hold the magnets on the background substrate structure. Then the various molded magnetic components of various shapes, sizes, and colors are stacked on to the first layer of molded magnetic components to construct a three-dimensional scene. In addition, greenery such as grass, weeds, etc., which have permanent magnets attached at the base, can be added to the scene to provide contrasting appearance. These magnets prevent the greenery from floating or otherwise moving around in the display water.

FIG. 2 is a cross sectional drawing of a section in the aquarium of FIG. 1 showing top and side views of the molded magnet components being stacked and magnetically attached to form a three-dimensional scene. A two-dimensional substrate structure 26 is formed using a ferromagnetic material. This substrate can be oriented in horizontal, vertical, or diagonal planes to form the general outline of a desired formation. A first layer of molded magnetic components 28 is magnetically attached to the substrate. Then a plurality of molded magnetic components 30–38 are stacked in additional layers on top of the first layer of components 28. This shows various sizes of rocks 30–34 stacked on top of the first layer of rocks 28 and smaller rocks 36–38 filling in the cracks. The side view illustrates the north and south magnetic poles of the molded magnetic components as they align and attach to one another, thereby providing a fixed arrangement that will not move around.

Finally, FIG. 3 is a cross sectional view of the magnetic rocks of FIG. 2, showing the magnetic particles 40 and the alignment of their magnetic moments 42.

While a preferred embodiment of the molded magnetic decorative components for use in aquatic environments has been described in detail, it should be apparent that modifications and variations thereto are possible, all of which fall within the true spirit and scope of the invention. With respect to the above description then, it is to be realized that the optimum dimensional relationships for the components of the invention, to include variations in size, materials, shape, color, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy ferromagnetic material, such as but not limited to iron, nickel-iron, and cobalt may be used to fabricate the substrate structure described. Also, magnetizable materials, included but not limited to iron, permalloy, 1040 alloy, superalloy, and silicon-iron can be used to mold and magnetize the various magnetic components. And any form of greenery with an attached permanent magnet base can be added to the scenery. Furthermore, the molded magnetic components of the present invention can be used in the dry environment of regular landscape applications.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An aquarium with magnetic ornamentation, comprising:

a water vessel, said vessel having transparent glass sides sealed at the corners and bottom by a water-tight scalant means, said vessel having a solid bottom, said vessel further having an open top;

magnetic underwater scenery formed on said bottom and partially on said sides of said vessel, said scenery being further comprised of:

a two-dimensional ferromagnetic substrate structure affixed by attaching means to one or more inside surface of said glass sides or said bottom of said water vessel, said substrate structure forming the primary background outlines of said underwater scenery in said vessel said substrate structure being oriented in various horizontal, vertical, and diagonal planes, a first layer plurality of molded magnetic components of various shapes, sizes, and colors being magnetically attached to said substrate;

a plurality of subsequent layers of said molded magnetic components of various shapes and sizes being magnetically attached to said first layer of said molded magnetic components, said molded magnetic components being stacked on top of each other, said magnetic component's north and south poles being attracted to one another, said plurality of molded magnetic components being tightly fixed in a static position, thereby creating a stable three dimensional form extending from said substrate structure; and said aquarium being filled with water.

2. The aquarium of claim 1, wherein said various shapes of molded magnetic components are selected from the group of identified shapes comprised of: rocks, gravel, reefs, and underwater icons.

3. The aquarium of claim 1, wherein one or more molded non-magnetic greenery items attached to a magnetic base is added to the scenery of the of said vessel, said greenery items being selected from the group comprised of: plants, weeds, and lily pads.

4. A method for creating underwater scenery, comprising the steps of:

molding decorative magnetic components of various sizes and colors in the shape of rocks, gravel, reefs, and underwater icons;

magnetizing said molded magnetic components;

forming a two-dimensional ferromagnetic substrate structure within a water vessel, said substrate structure forming the primary background outlines of said underwater scenery, said substrate being oriented in various horizontal, vertical, and diagonal planes;

affixing said substrate structure in said scenery by attaching means;

applying a first layer plurality of molded magnetic components of various shapes, sizes, and colors, said shapes being magnetically attached to said substrate; and applying a plurality of subsequent layers of said molded magnetic components of various shapes, sizes, and colors, said shapes magnetically attached to said first layer of said magnetic components, said subsequent magnetic components being stacked on top of each other, said magnetic component's north and south poles being attracted to one another, said plurality of molded magnetic components being tightly fixed in a static position, thereby creating a stable three-dimensional scenery extending from said substrate structure.

5. The display of claim 4, wherein the application of said underwater scenery is included in the group comprised of: aquariums, water fountains, caves and tunnels at amusement parks and museums.

6. The display of claim 4, wherein said display is applied in dry landscape environments.

7. The display of claim 4, wherein one or more non-magnetic greenery items is added to said scenery, said item(s) being molded around a permanent magnet base for attaching to other magnetic components or to said ferromagnetic substrate structure thereby holding said scenery in a fixed position to create a visually pleasing scene.

8. A magnetic aquatic display, comprising:

a two-dimensional ferromagnetic substrate structure affixed by attaching means to one or more inside surface of said glass sides or said bottom of said water vessel, said substrate structure forming the primary background outlines of the underwater scenery in said display, said substrate being oriented in various horizontal, vertical, and diagonal planes;

a first layer plurality of molded magnetic components of various shapes, sizes, and colors being magnetically attached to said substrate;

a plurality of subsequent layers of said molded magnetic components of various shapes and sizes being magnetically attached to said first layer of said molded magnetic components, said molded magnetic components being stacked on top of each other, said magnetic component's north and south poles being attracted to one another said plurality of molded magnetic components being tightly fixed in a static position, thereby creating a stable three dimensional form extending from said substrate structure; and a source of water being in, over, or around said display.

9. The display of claim 8, wherein said various shapes of molded magnetic components are selected from the group of identified shapes comprised of: rocks, gravel, reefs, and underwater icons.

10. The display of claim 8, wherein the application of said underwater scenery is included in the group comprised of: aquariums, water fountains, caves and tunnels at amusement parks and museums.

11. The display of claim 8, wherein said display is applied in dry landscape environments.

12. The display of claim 8, wherein one or more non-magnetic greenery items is added to said scenery, said item(s) being molded around a permanent magnet base for attaching to other magnetic components or to said ferromagnetic substrate structure, thereby holding said scenery in a fixed position to create a visually pleasing scene.

* * * * *